(12) United States Patent
Chang

(10) Patent No.: US 7,746,580 B2
(45) Date of Patent: Jun. 29, 2010

(54) ZOOM LENS MODULE

(75) Inventor: Jen-Tsorng Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 234 days.

(21) Appl. No.: 11/945,516

(22) Filed: Nov. 27, 2007

(65) Prior Publication Data

US 2008/0165432 A1   Jul. 10, 2008

(30) Foreign Application Priority Data

Dec. 22, 2006   (TW) ............................... 95148476 A

(51) Int. Cl.
*G02B 7/02* (2006.01)
(52) U.S. Cl. .................. 359/819; 359/822; 359/811
(58) Field of Classification Search .................. 359/819, 359/821, 822, 823, 826, 827, 830
See application file for complete search history.

(56) References Cited

U.S. PATENT DOCUMENTS 4,500,180 A * 2/1985 Stevens ....................... 351/234
6,501,909 B1 * 12/2002 Nishimura et al. ............ 396/74

FOREIGN PATENT DOCUMENTS

| CN | 2653548 Y | 11/2004 |
| CN | 1710454 A | 12/2005 |
| CN | 1786759 A | 6/2006 |

* cited by examiner

*Primary Examiner*—Timothy J Thompson
(74) *Attorney, Agent, or Firm*—Jeffrey T. Knapp

(57) ABSTRACT

An exemplary zoom lens includes a first lens and a lens assembly. The lens assembly includes a mounting plate and a plurality of second lenses formed on the mounting plate. The second lenses are integrally formed with the mounting plate. Each of the second lenses has a distinct focal length. The lens assembly is rotatable in such a manner that each of the second lenses is selectively in optical alignment with the first lens.

16 Claims, 3 Drawing Sheets

ZOOM LENS MODULE

BACKGROUND

1. Technical Field

The present invention relates to the optical imaging field and, particularly, to a zoom lens module and a zoom camera module having the same.

2. Description of Related Art

With the development of the optical imaging technology, camera modules are widely used in a variety of electronic devices, such as mobile phones, and Personal Digital Assistants (PDAs).

Since the camera module is desirably to be mounted in small-sized mobile phones or PDAs, a fixed focus lens module is usually adopted due to its relatively small thickness. However, images captured by a camera module with a fixed focus lens module tend to be poor in quality. This is partly due to the fixed focus lens module, which is incapable of adjusting a focal length to make a good-quality image.

A conventional zoom camera module usually uses an actuator, such as a step motor to zoom. In order to zoom, the actuator drives a first lens group to move along an optical axis relative to a second lens group. Such a zoom camera module inevitably has a relatively large thickness in a direction of the optical axis. Accordingly, such a step motor is not suitable to be used in a mobile phone or PDA, which requires a small thickness.

Therefore, a new zoom lens module and a new zoom camera module are desired to overcome the above mentioned problems.

SUMMARY

An exemplary zoom lens module includes a first lens and a lens assembly. The lens assembly includes a mounting plate and a plurality of second lenses integrally formed on the mounting plate. Each of the second lenses has a distinct focal length. The lens assembly is rotatable in such a manner that each of the second lenses is selectively in optical alignment with the first lens.

An exemplary zoom camera module includes a first lens, a lens assembly, and an image sensor. The image sensor is coaxially aligned with the first lens. The lens assembly is disposed between the first lens and the image sensor. The lens assembly includes a mounting plate and a plurality of second lenses integrally formed on the mounting plate. Each of the second lenses has a distinct focal length. The lens assembly is rotatable in such a manner that each of the second lenses is selectively in optical alignment with the first lens.

BRIEF DESCRIPTION OF THE DRAWINGS

Many aspects of the embodiment can be better understood with references to the following drawings. The components in the drawings are not necessarily drawn to scale, the emphasis instead being placed upon clearly illustrating the principles of the present embodiment. Moreover, in the drawings, like reference numerals designate corresponding parts throughout the several views.

DETAILED DESCRIPTION OF THE EMBODIMENTS

Embodiments will now be described in detail below with reference to the drawings.

Figure 1:
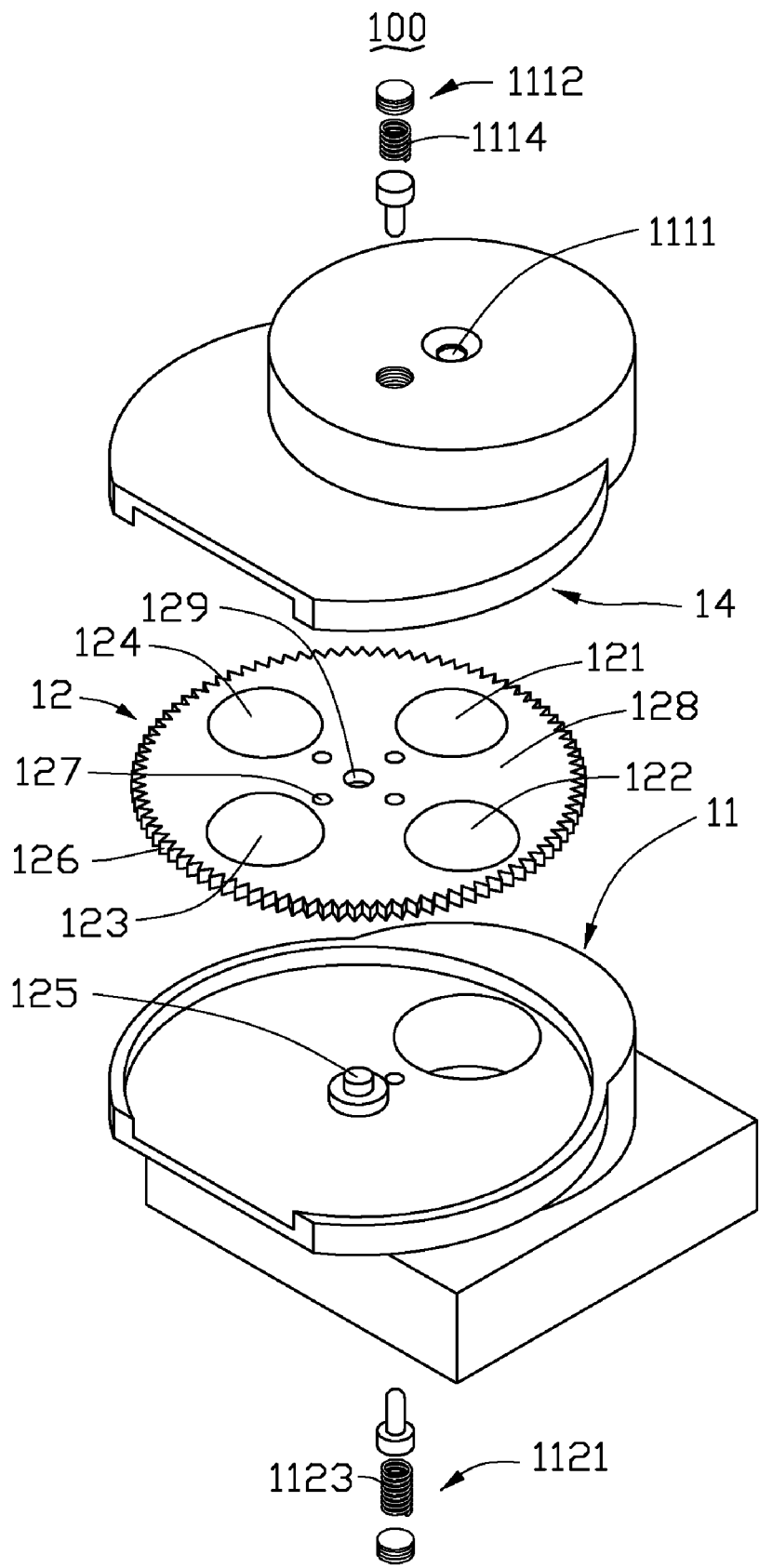
FIG. 1 is a schematic, exploded perspective view of a zoom camera module, according to a present embodiment.
Figure 2:
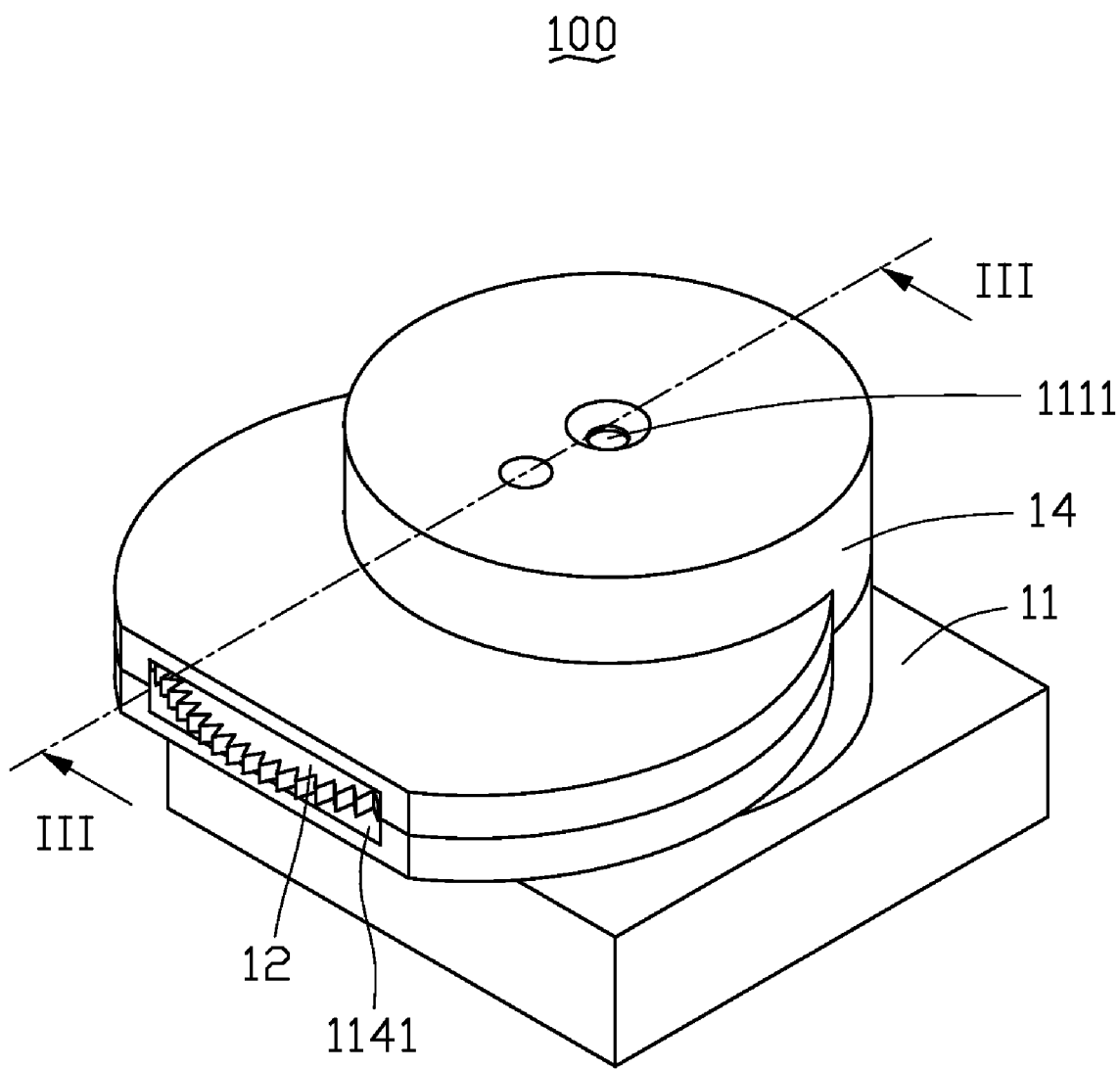
FIG. 2 is a schematic, perspective view of the zoom camera module in assembly of FIG. 1.
Figure 3:
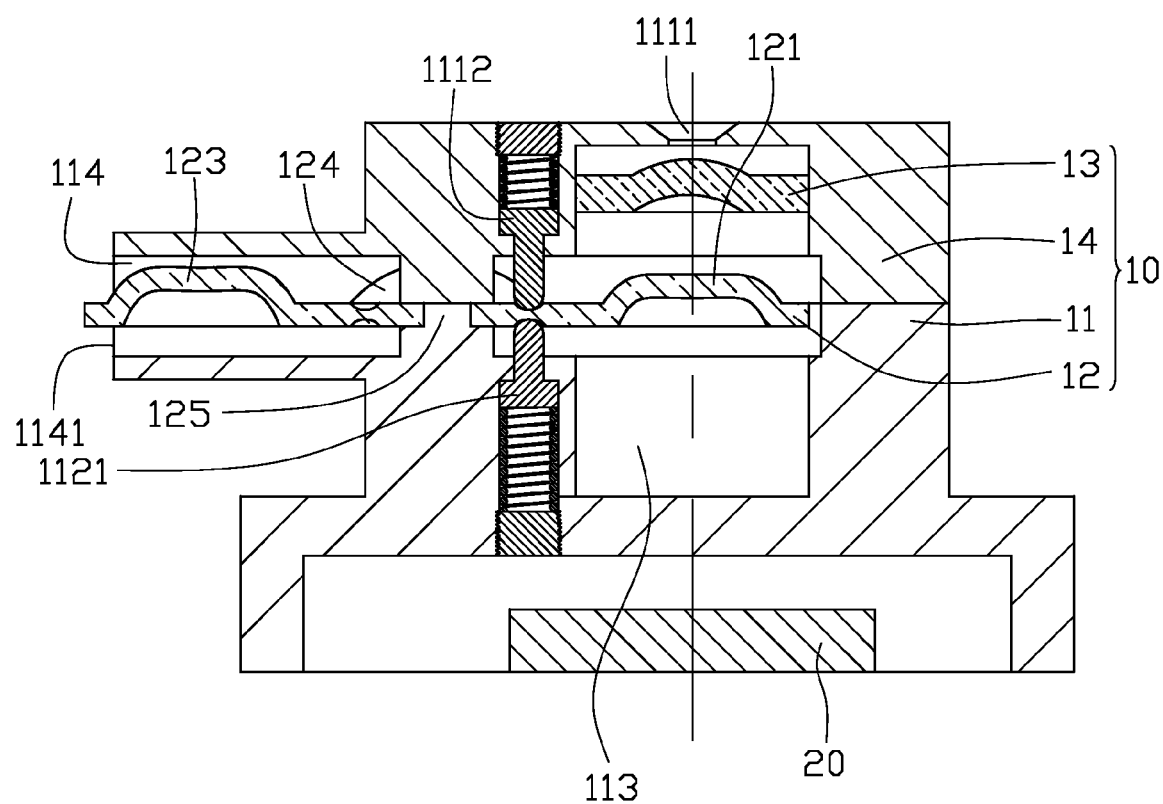
FIG. 3 is a schematic, side cross-sectional view of the zoom camera module of FIG. 1 taken along the line III-III.

Referring to FIGS. 1 to 3, a zoom camera module 100 of an exemplary embodiment is shown. The zoom camera module 100 includes a zoom lens module 10 and an image sensor 20. The zoom lens module 10 includes a holder 11, a barrel 14 engaging with the holder 11, a lens assembly 12, and a fixed lens 13. The barrel 14 is fixedly mounted with the holder 11 via, e.g., a mechanical fastener, or an adhesive. The fixed lens 13 is received in the barrel 14. The image sensor 20 is disposed in the holder 11. The fixed lens 13 coaxially aligns with the image sensor 20. The barrel 14 and the holder 11 cooperatively form an accommodating room 114 therebetween. The accommodating room 114 has an opening 1141. The holder 11 has a shaft 125 extending through the lens assembly 12. The barrel 14 has a light incident hole 1111 defined therein at a top portion thereof. The light incident hole 1111 aligns with the fixed lens 13 such that light from outside passes through the fixed lens 13 via the light incident hole 1111.

The lens assembly 12 is disposed in the accommodating room 114. Part of the lens assembly 12 is exposed outwardly through the opening 1141 of the accommodating room 114. The lens assembly 12 has a center (not labeled) and a central axis (not shown) passing through the center. The central axis corresponds to a lengthwise direction of the shaft 125. The lens assembly 12 includes a mounting plate 128 and a plurality of lenses 121, 122, 123, 124 integrally formed on the mounting plate 128. The mounting plate 128 includes a shaft hole 129 defined at a central portion thereof. The shaft 125 is fitted into the shaft hole 129. The lenses 121, 122, 123, 124 each have a distinct focal length. The lenses 121, 122, 123, 124 are distributed along a first circle. A center of the first circle is the center of the lens assembly 12. The lens assembly 12 is rotatable around the shaft 125 such that the lenses 121, 122, 123, 124 each selectively align with the fixed lens 13. When each of the lenses 121, 122, 123, 124 couples with the fixed lens 13, the zoom lens module 10 has different effective focal lengths (EFLs), thus achieving a zooming function. In the present embodiment, there are a total of four lenses 121, 122, 123, 124. It should be noted that the total number of the lenses can instead be two, three, five, and so on.

The mounting plate 128 has a toothed structure 126 at a circumference thereof. Part of the toothed structure 126 of the mounting plate 128 is exposed through the opening 1141 of holder 11. The mounting plate 128 can be meshed with a driving device (not shown; e.g., a gear wheel and/or a motor) at the toothed structure 126 of the exposed part of the mounting plate 128 via the opening 1141. Thus, the mounting plate 128 can be driven to rotate around the shaft 125 by the driving device.

Alternatively, the mounting plate 128 can be driven to rotate manually by a user using the toothed structure 126 of the mounting plate 128. Also alternatively, the shaft 125 can be connected with a driving device (not shown; e.g., a motor), and the mounting plate 128 can be driven by the shaft 125.

An opaque material (not shown) can further be applied on one or both surfaces of the mounting plate 128 except at areas with the lenses 121, 122, 123, 124. The opaque material is configured for avoiding flare and ghost image caused by a large area of light transmittance.

The mounting plate 128 is integrally formed with the lenses 121, 122, 123, 124. So each lens (e.g., the lens 121) accurately keeps a constant distance between other lenses (e.g., the lenses 122, 123, 124). Furthermore, it is not necessary to assemble a plurality of individual lenses into the mounting plate 128, thus facilitating the assembly of the zoom camera module 100.

In a zooming operation, each lens 121, 122, 123, 124 of distinct focal lengths is selectively in optical alignment with the fixed lens 13 by rotating the lens assembly 12. By shifting the lenses 121, 122, 123, 124, the zoom lens module 10 has different effective focal lengths, thus achieving a zooming function.

In the present zoom lens camera 100, zooming is achieved by rotating the lens assembly 12 instead of using an actuator to drive one lens to move along an optical axis relative to another lens. Therefore, the zoom lens camera 100 has a relatively small thickness in a direction of an optical axis thereof.

In order to align the lenses 121, 122, 123, 124 more accurately with the fixed lens 13, the mounting plate 128 further has a plurality of positioning holes 127 defined therein around the shaft hole 129. The plurality of positioning holes 127 are distributed along a second circle. A center of the second circle is the center (not labeled) of the lens assembly 12. A total number of the positioning holes 127 is identical with that of the lenses of the lens assembly 12. A given positioning hole 127 is in a line connecting the center (not labeled) of the lens assembly 12 and a center of a given lens (e.g., the lens 121).

Correspondingly, the holder 11 and the barrel 14 each have dowel pins 1112, 1121 for engaging with the positioning holes 127. Each of the dowel pins 1112 and 1121 has a spring 1114, 1123 such that the dowel pins can extend or contract in a direction parallel to the lengthwise direction of the shaft 125.

In operation, when a first given lens (e.g., the lens 121) aligns with the fixed lens 13, the dowel pins 1112, 1121 insert a first given positioning hole 127, thereby accurately positioning the lens assembly 12. When the lens assembly 12 is driven to rotate counterclockwise, the dowel pins 1112, 1121 contract, and slide out from the first given positioning hole 127. After the lens assembly 12 has been driven to rotate a predetermined angle (e.g., 90 degrees, i.e., a quarter of a circle), a second given lens 122 aligns with the fixed lens 13. At the same time, the dowel pins 1112, 1121 slide into a second given positioning hole 127, and insert into the second given positioning hole 127, thereby accurately positioning the lens assembly 12.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A zoom lens module, comprising:
a barrel;
a first lens received in the barrel;
a holder engaging with the barrel, the holder and the barrel cooperatively forming an accommodating room therebetween, the holder comprising a first dowel pin;
a shaft formed in the holder; and
a lens assembly positioned in the accommodating room, the lens assembly having a mounting plate, and a plurality of second lenses formed on the mounting plate, the mounting plate defining a shaft hole at a central portion thereof, and a plurality of first positioning holes around the shaft hole, the first positioning holes corresponding to the respective second lenses, and the shaft extending through the shaft hole, the second lenses being integrally formed with the mounting plate, each of the second lenses having a distinct focal length, and the lens assembly being rotatable around the shaft in such a manner that each of the second lenses is selectively positionable in optical alignment with the first lens, wherein the first dowel pin is configured for engaging in each of the first positioning holes according to the selective positioning of each of the second lenses.

2. The zoom lens module as claimed in claim 1, wherein the lens assembly has a center and a central axis passing through the center, the lens assembly being rotatable around the central axis.

3. The zoom lens module as claimed in claim 2, wherein the second lenses are distributed along a circle centered at the center of the lens assembly.

4. The zoom lens module as claimed in claim 1, wherein the mounting plate has a plurality of teeth at a circumference thereof 5. The zoom lens module as claimed in claim 1, wherein the accommodating room has an opening, and part of the lens assembly is exposed from the accommodating room via the opening.

6. The zoom lens module as claimed in claim 1, wherein the lens assembly further has a plurality of second positioning holes around the shaft hole, the second positioning holes corresponding to the respective second lenses, the first and the second positioning holes being formed on two opposite sides of the mounting plate, and the barrel further comprising a second dowel pin for engaging in each of the second positioning holes according to the selective positioning of each of the second lenses.

7. The zoom lens module as claimed in claim 1, wherein the first dowel pin is spring-loaded.

8. The zoom lens module as claimed in claim 6, wherein the second dowel pin is spring-loaded.

9. A zoom lens module, comprising:
a barrel comprising a first dowel pin;
a first lens received in the barrel;
a holder engaging with the barrel, the holder and the barrel cooperatively forming an accommodating room therebetween;
a shaft formed in the holder; and
a lens assembly positioned in the accommodating room, the lens assembly comprising a mounting plate, and a plurality of second lenses formed on the mounting plate, the mounting plate defining a shaft hole at a central portion thereof, and a plurality of first positioning holes around the shaft hole, the first positioning holes corresponding to the respective second lenses, and the shaft extending through the shaft hole, the second lenses being integrally formed with the mounting plate, each of the second lenses having a distinct focal length, and the lens assembly being rotatable around the shaft in such a manner that each of the second lenses is selectively positionable in optical alignment with the first lens, wherein the first dowel pin is configured for engaging in each of the first positioning holes according to the selective positioning of each of the second lenses.

10. The zoom lens module as claimed in claim 9, wherein the lens assembly has a center and a central axis passing through the center, the lens assembly being rotatable around the central axis.

11. The zoom lens module as claimed in claim 10, wherein the second lenses are distributed along a circle centered at the center of the lens assembly.

12. The zoom lens module as claimed in claim 9, wherein the mounting plate has a plurality of teeth at a circumference thereof.

13. The zoom lens module as claimed in claim 9, wherein the accommodating room has an opening, and part of the lens assembly is exposed from the accommodating room via the opening.

14. The zoom lens module as claimed in claim 9, wherein the lens assembly further comprises a plurality of second positioning holes around the shaft hole, the second positioning holes corresponding to the respective second lenses, and wherein the first and the second positioning holes are located on two opposite sides of the mounting plate, and the holder comprises a second dowel pin for engaging in each of the second positioning holes according to the selective positioning of each of the second lenses.

15. The zoom lens module as claimed in claim 9, wherein the first dowel pin is spring-loaded.

16. The zoom lens module as claimed in claim 14, wherein the second dowel pin is spring-loaded.

* * * * *